United States Patent
Hikiji et al.

(10) Patent No.: US 12,226,836 B2
(45) Date of Patent: Feb. 18, 2025

(54) CUTTING TOOL

(71) Applicant: Sumitomo Electric Hardmetal Corp., Itami (JP)

(72) Inventors: Masahito Hikiji, Itami (JP); Takato Yamanishi, Itami (JP); Takahiro Yamakawa, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 0 days.

(21) Appl. No.: 18/571,264

(22) PCT Filed: Jun. 22, 2023

(86) PCT No.: PCT/JP2023/023096
§ 371 (c)(1),
(2) Date: Dec. 18, 2023

(87) PCT Pub. No.: WO2024/261951
PCT Pub. Date: Dec. 26, 2024

(65) Prior Publication Data
US 2024/0424576 A1 Dec. 26, 2024

(51) Int. Cl.
*B23B 27/14* (2006.01)

(52) U.S. Cl.
CPC ........ *B23B 27/148* (2013.01); *B23B 2224/04* (2013.01); *B23B 2224/32* (2013.01); *B23B 2228/105* (2013.01)

(58) Field of Classification Search
None
See application file for complete search history.

(56) References Cited

U.S. PATENT DOCUMENTS

| 2011/0003126 A1 | 1/2011 | Van Den Berg et al. |
| 2021/0107066 A1 * | 4/2021 | Tanaka ............... C23C 16/40 |

FOREIGN PATENT DOCUMENTS

| CN | 113512716 A | * | 10/2021 |
| EP | 4144466 A1 | | 3/2023 |
| EP | 4147808 A1 | | 3/2023 |
| EP | 4147809 A1 | | 3/2023 |
| JP | H05-177413 A | | 7/1993 |
| JP | 2008-168365 A | | 7/2008 |
| JP | 2020-037150 A | | 3/2020 |
| JP | 2020-116645 A | | 8/2020 |

(Continued)

OTHER PUBLICATIONS

Translation—CN-113512716-A; Guo et al.; Oct. 19, 2021 (Year: 2021).*

(Continued)

*Primary Examiner* — Humera N. Sheikh
*Assistant Examiner* — Elizabeth D Ivey
(74) *Attorney, Agent, or Firm* — XSENSUS LLP

(57) ABSTRACT

A cutting tool including a substrate and a coated film arranged on the substrate, in which the coated film includes a first layer positioned on the substrate, a second layer positioned on the first layer, and a third layer positioned on the second layer, the first layer is composed of titanium carbonitride, the second layer is composed of aluminum oxide, the third layer is composed of titanium carbonitride, a residual stress X of the first layer, a residual stress Y of the second layer and a residual stress Z of the third layer satisfy a relationship of formula 1.

20 Claims, 2 Drawing Sheets

(56) References Cited

FOREIGN PATENT DOCUMENTS

| WO | 2009/112116 A1 | 9/2009 |
| WO | 2019/181786 A1 | 9/2019 |
| WO | 2022/244241 A1 | 11/2022 |
| WO | 2022/244242 A1 | 11/2022 |
| WO | 2022/244243 A1 | 11/2022 |

OTHER PUBLICATIONS

Written Opinion mailed on Aug. 1, 2023, received for PCT Application PCT/JP2023/023096, filed on Jun. 22, 2023, 7 pages including English Translation.

* cited by examiner

CUTTING TOOL

CROSS-REFERENCE TO RELATED APPLICATION

The present application is based on PCT filing PCT/JP2023/023096, filed Jun. 22, 2023, the entire contents of which are incorporated herein by reference.

TECHNICAL FIELD

The present disclosure relates to a cutting tool.

BACKGROUND ART

Conventionally, cutting tools including a substrate and a coated film arranged on the substrate, have been used for cutting processing (Patent Literatures 1 to 6).

CITATION LIST

Patent Literature

PTL 1: Japanese Patent Laying-Open No. 2020-037150
PTL 2: Japanese Patent Laying-Open No. 2020-116645
PTL 3: WO2009/112116
PTL 4: WO2022/244241
PTL 5: WO2022/244242
PTL 6: WO2022/244243

SUMMARY OF INVENTION

The cutting tool of the present disclosure is a cutting tool including a substrate and a coated film arranged on the substrate,
wherein the coated film includes a first layer positioned on the substrate, a second layer positioned on the first layer, and a third layer positioned on the second layer,
wherein the first layer is composed of titanium carbonitride,
wherein the second layer is composed of aluminum oxide,
wherein the third layer is composed of titanium carbonitride,
wherein a residual stress X of the first layer, a residual stress Y of the second layer and a residual stress Z of the third layer satisfy a relationship of formula 1:

$$X<Y<Z \qquad \text{formula 1.}$$

DETAILED DESCRIPTION

Figure 1:
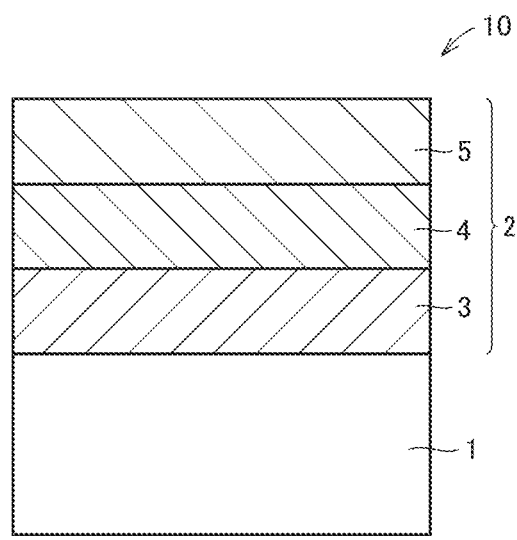
FIG. 1 is a schematic cross-sectional view illustrating one aspect of the cutting tool of the present disclosure.

Problem to be Solved by the Present Disclosure

In recent years, there have been increasing demands for improvement on a tool service life, particularly in light intermittent turning of alloy steel with a black skin material Examples of important factors for further improvement on the tool service life in light intermittent turning of alloy steel with a black skin material include "wear resistance" and "breakage resistance". Moreover, from the viewpoint of improving wear resistance, in light intermittent turning of alloy steel with a black skin material, a cutting tool including a substrate and a coated film arranged on the substrate, wherein the coated film includes a first layer positioned on the substrate, a second layer positioned on the first layer, and a third layer positioned on the second layer, the first layer is composed of titanium carbonitride, the second layer is composed of aluminum oxide, and the third layer is composed of titanium carbonitride, is used. However, such a coated film may have had insufficient "breakage resistance" due to difficulty in introducing a sufficient residual stress to the first layer in relation to the third layer being likely to be destroyed by blast processing. Moreover, wear may have easily resulted due to minute damage caused by insufficient "breakage resistance" (i.e., "wear resistance" may have been insufficient). Therefore, by combining excellent "wear resistance" with excellent "breakage resistance", prolongation of a tool service life has been required, particularly even in light intermittent turning of alloy steel with a black skin material.

Therefore, an object of the present disclosure is to provide a cutting tool having a long tool service life, particularly even in light intermittent turning of alloy steel with a black skin material.

Advantageous Effect of the Present Disclosure

According to the present disclosure, a cutting tool having a long tool service life, particularly even in light intermittent turning of alloy steel with a black skin material, can be provided.

DESCRIPTION OF EMBODIMENTS

Embodiments of the present disclosure will be first described by listing them.
(1) The cutting tool of the present disclosure is
a cutting tool including a substrate and a coated film arranged on the substrate,
wherein the coated film includes a first layer positioned on the substrate, a second layer positioned on the first layer, and a third layer positioned on the second layer,
wherein the first layer is composed of titanium carbonitride,
wherein the second layer is composed of aluminum oxide,
wherein the third layer is composed of titanium carbonitride,
wherein a residual stress X of the first layer, a residual stress Y of the second layer and a residual stress Z of the third layer satisfy a relationship of formula 1:

$$X<Y<Z \qquad \text{formula 1}$$

According to the present disclosure, a cutting tool having a long tool service life, particularly even in light intermittent turning of alloy steel with a black skin material, can be provided.
(2) In (1) above, the residual stress X of the first layer is preferably −1.0 GPa or more and −0.3 GPa or less. This can provide a cutting tool having a longer tool service life, particularly even in light intermittent turning of alloy steel with a black skin material.
(3) In (1) or (2) above, the residual stress Y of the second layer is preferably −0.5 GPa or more and 0.1 GPa or less. This can provide a cutting tool having a longer tool service life, particularly even in light intermittent turning of alloy steel with a black skin material.

(4) In any one of (1) to (3) above, the residual stress Z of the third layer is preferably −0.3 GPa or more and 0.4 GPa or less. This can provide a cutting tool with a longer tool service life, particularly even in light intermittent turning of alloy steel with a black skin material.

(5) In any one of (1) to (4) above, a thickness of the first layer is preferably 3 µm or more and 15 µm or less. This can provide a cutting tool with a longer tool service life, particularly even in light intermittent turning of alloy steel with a black skin material.

(6) In any one of from (1) to (5), a thickness of the second layer is preferably 3 µm or more and 15 µm or less. This can provide a cutting tool with a longer tool service life, particularly even in light intermittent turning of alloy steel with a black skin material.

(7) In any one of (1) to (6), a thickness of the third layer is preferably 2 µm or more and 4 µm or less. This can provide a cutting tool with a longer tool service life, particularly even in light intermittent turning of alloy steel with a black skin material.

Details of Embodiments of the Present Disclosure

Specific examples of one embodiment of the present disclosure (hereinafter also referred to as "the present embodiment") will be described below with referring to the drawings. In the drawings of the present disclosure, the same reference sign represents the same portion or equivalent portion. Moreover, dimensional relationships such as a length, width, thickness, and depth have been appropriately changed for the sake of clarity and simplification of the drawings, and do not necessarily represent actual dimensional relationships.

The notation in the form "A to B" used herein refers to the upper limit and lower limit of the range (i.e., A or more and B or less), and when no unit is described in A and a unit is described only in B, the unit of A is the same as that of B.

Embodiment 1: Cutting Tool

A cutting tool according to one embodiment of the present disclosure will be described using FIG. 1.

One embodiment of the present disclosure (hereinafter also referred to as the "present embodiment") is
  a cutting tool 10 including a substrate 1 and a coated film 2 arranged on substrate 1,
  wherein coated film 2 includes a first layer 3 positioned on substrate 1, a second layer 4 positioned on first layer 3, and a third layer 5 positioned on second layer 4,
  wherein first layer 3 is composed of titanium carbonitride,
  wherein second layer 4 is composed of aluminum oxide,
  wherein third layer 5 is composed of titanium carbonitride,
  wherein a residual stress X of first layer 3, a residual stress Y of second layer 4 and a residual stress Z of third layer 5 satisfy a relationship of formula 1:

$$X<Y<Z \quad \text{formula 1.}$$

According to the present disclosure, it is possible to provide a cutting tool with a long tool service life, particularly even in light intermittent turning of alloy steel with a black skin material. The reason therefore is presumed as follows.

Residual stress X of first layer 3, residual stress Y of second layer 4 and residual stress Z of third layer 5 satisfy the relationship of formula 1:

$$X<Y<Z \quad \text{formula 1}$$

This can improve breakage resistance in a relationship where a residual stress on a substrate 1 side of coated film 2 are relatively low. Moreover, film destruction due to stress introduction is lowered in relation to a residual stress on a surface side of coated film 2 being relatively higher, which facilitates inhibition of dropout of a film structure, thereby enabling improvement of wear resistance.

In other words, according to the present disclosure, cutting tool 10 is capable of combining excellent "wear resistance" and excellent "breakage resistance," whereby a cutting tool with a long tool service life, particularly even in light intermittent turning of alloy steel with a black skin material, can be provided.

<<Cutting Tool>>

As shown in FIG. 1, cutting tool 10 according to one embodiment of the present disclosure includes substrate 1 and coated film 2 arranged on substrate 1. Coated film 2 preferably covers the entire surface of substrate 1, however, even if a portion of substrate 1 is not covered by coated film 2 or a composition of coated film 2 is partially different, the scope of the present embodiment shall not be deviated. In a case in which a portion of substrate 1 is not covered with coated film 2, coated film 2 is preferably arranged so as to cover a surface of a portion of substrate 1 at least involved in cutting. The portion of substrate 1 herein that is involved in cutting refers to, depending on the size and shape of substrate 1, a region surrounded by a cutting edge ridgeline of the cutting tool and a hypothetical plane in which a distance from the cutting edge ridgeline to a substrate 1 side along a perpendicular line tangent to the cutting edge ridgeline, is, for example, either 5 mm, 3 mm, 2 mm, 1 mm, or 0.5 mm.

Cutting tool 10 of the present embodiment can be suitably used as cutting tools 10 such as a drill, an end mill, an indexable cutting insert for drills, an indexable cutting insert for end mills, an indexable cutting insert for milling, an indexable cutting insert for turning, a metal saw, a gear cutting tool, a reamer, a tap, and the like.

<<Substrate>>

Substrate 1 that is any conventionally known substrate 1 of this type, can be used. For example, it is preferably any of cemented carbides (WC-based cemented carbide, cemented carbide containing WC and Co, cemented carbides further added with carbonitrides of Ti, Ta, Nb, and the like, and the like), cermets (mainly composed of TiC, TiN, TiCN, or the like), high speed steel, ceramics (titanium carbide, silicon carbide, silicon nitride, aluminum nitride, aluminum oxide, and the like), a cubic boron nitride sintered material, or a diamond sintered material.

Among these various substrates 1, particularly the WC-based cemented carbide and cermet (particularly TiCN-based cermet), are preferably selected. These substrates 1 are excellent in balance between a hardness and a strength, in particular at high temperatures, whereby in the case of using substrate 1 as that of cutting tool 10, substrate 1 can contribute to a long service life of cutting tool 10.

<<Coated Film>>

Coated film 2 includes first layer 3 positioned on substrate 1, second layer 4 positioned on first layer 3, and third layer 5 positioned on second layer 4. Coated film 2 covering substrate 1 improves various properties such as wear resistance and chipping resistance of cutting tool 10, thereby having an action of prolonging a service life of cutting tool 10. Note, however, coated film 2 can include, in addition to first layer 3, second layer 4, and third layer 5, "other layers" as described below to the extent that the effects of the present disclosure are not impaired.

A thickness of coated film 2 is preferably 6 μm or more and 30 μm or less. The thickness of coated film 2 being thinner than 6 μm facilitates a service life of cutting tool 10 to be shortened due to the too thin thickness of coated film 2. The thickness of coated film 2 being thicker than 30 μm, on the other hand, facilitates chipping of coated film 2 to occur in an early stage of cutting, whereby the service life of cutting tool 10 tends to be likely to shorten. A thickness of coated film 3 can be measured by observing a cross-section of coated film 2 with a scanning electron microscope (SEM). Specifically, with observation magnification of a cross-sectional sample of 5,000 to 10.000 times and an observation area of 100 to 500 μm$^2$, thickness widths at three locations in one field of view, are measured to obtain an average value thereof and used as the "thickness". The same applies to a thickness of each layer described below, unless otherwise described.

<First Layer>
<Composition of the First Layer>

First layer 3 is composed of titanium carbonitride. Here, the "being composed of titanium carbonitride" means that unavoidable impurities can be included in addition to titanium carbonitride as long as the effects of the present disclosure are exhibited. Examples of the unavoidable impurities include, for example, chlorine atoms (Cl) and the like. The content rate of the total unavoidable impurities in first layer 3 is preferably greater than 0% by mass and less than 3% by mass.

First layer 3 being composed of titanium carbonitride is measured by an X-ray diffraction (XRD) method and an energy dispersive X-ray analysis (EDX). The content rate of unavoidable impurities in first layer 3 is measured by secondary ion mass spectrometry (SIMS). Note, however, as long as the measurement is carried out on the same cutting tool 10, it has been confirmed that there is no variation in the measurement results even if measurement points are arbitrarily selected.

<Structure of the First Layer>

A thickness of first layer 3 is preferably 3 μm or more and 15 μm or less. This enables achievement of both superior wear resistance and superior breakage resistance, whereby a cutting tool with a longer tool service life, particularly even in light intermittent turning of alloy steel with a black skin material, can be provided. The lower limit of the thickness of first layer 3 is preferably 3 μm or more, more preferably 5 μm or more, and further preferably 7 μm or more. The upper limit of the thickness of first layer 3 is preferably 15 μm or less, more preferably 13 μm or less, and further preferably 11 μm or less. The thickness of first layer 3 is more preferably 5 μm or more and 13 μm or less and further preferably 7 μm or more and 11 μm or less.

<Residual Stress of the First Layer>

A residual stress X of first layer 3 is preferably −1.0 GPa or more and −0.3 GPa or less. This facilitates expansion of damage to be inhibited when minute breakage occurs, whereby a cutting tool with a longer tool service life, particularly even in light intermittent turning of alloy steel with a black skin material, can be provided. The lower limit of residual stress X of first layer 3 is preferably −1.0 GPa or more, more preferably −0.9 GPa or more, and further preferably −0.8 GPa or more. The upper limit of residual stress X of first layer 3 is preferably −0.3 GPa or less, more preferably −0.4 GPa or less, and further preferably −0.5 GPa or less. Residual stress X of first layer 3 is more preferably −0.9 GPa or more and −0.4 GPa or less and further preferably −0.8 GPa or more and −0.5 GPa or less.

Residual stress X of first layer 3 can be identified by carrying out measurement on first layer 3 using a sin 2ψ method (see pp. 54 to 66 of "X-ray Stress Measurement Method", the Society of Materials Science, Japan, 1981, published by Yokendo Ltd. Publishers). It is noted that the temperature is room temperature (20° C.) in this measurement. As long as the same cutting tool 10 is used for the measurement, it has also been confirmed that there is no variation in the measurement results even if measurement points are arbitrarily selected.

<Second Layer>
<Composition of the Second Layer>

Second layer 4 is composed of aluminum oxide. Here, the "being composed of aluminum oxide" means that unavoidable impurities can be included in addition to aluminum oxide as long as the effect of the present disclosure is exhibited Examples of the unavoidable impurities include, for example, chlorine atoms (Cl) and the like. The content rate of the total unavoidable impurities in second layer 4 is greater than 0% by mass and less than 3% by mass.

Second layer 4 being composed of aluminum oxide is measured by an X-ray diffraction (XRD) method and an energy dispersive X-ray analysis (EDX). In second layer 4, the content rate of unavoidable impurities is measured by secondary ion mass spectrometry (SIMS). Note, however, as long as the measurement is carried out on the same cutting tool 10, it has been confirmed that there is no variation in the measurement results even if measurement points are arbitrarily selected.

<Structure of the Second Layer>

A thickness of second layer 4 is preferably 3 μm or more or 15 μm or less. This makes it possible to achieve both superior wear resistance and superior breakage resistance, whereby a cutting tool with a longer tool service life, particularly even in light intermittent turning of alloy steel with a black skin material, can be provided. The lower limit of the thickness of second layer 4 is preferably 3 μm or more, more preferably 5 μm or more, and further preferably 7 μm or more. The upper limit of the thickness of second layer 4 is preferably 15 μm or less, more preferably 13 μm or less, and further preferably 11 μm or less. The thickness of second layer 4 is more preferably 5 μm or more and 13 μm or less and further preferably 7 μm or more and 11 μm or less.

<Residual Stress of the Second Layer>

A residual stress Y of second layer 4 is preferably −0.5 GPa or more and 0.1 GPa or less. This is capable of improving breakage resistance in a relationship where an alumina structure is unlikely to be destroyed due to moderate introduction of a residual stress, whereby a cutting tool with longer tool service life, particularly even in light intermittent turning of alloy steel with a black skin material, can be provided. The lower limit of residual stress Y of second layer 4 is preferably −0.5 GPa or more, more preferably −0.4 GPa or more, and further preferably −0.3 GPa or more. The upper limit of residual stress Y of second layer 4 is preferably 0.1 GPa or less, more preferably 0 GPa or less, and further preferably −0.1 GPa or less. Residual stress Y of second layer 4 is more preferably −0.4 GPa or more and 0 GPa or less and further preferably −0.3 GPa or more and −0.1 GPa or less.

Residual stress Y of second layer 4 can be specified by the same method as that for residual stress X of first layer 3, except that measurement is carried out for second layer 4. Note, however, as long as the measurement is carried out on the same cutting tool 10, it has been confirmed that there is no variation in the measurement results even if measurement points are selected arbitrarily.

<Third Layer>
<Composition of the Third Layer>

Third layer 5 is composed of titanium carbonitride. Here, the "being composed of titanium carbonitride" means that unavoidable impurities can be included in addition to titanium carbonitride as long as the effects of the present disclosure are exhibited. The unavoidable impurities include, for example, chlorine atoms (Cl) and the like. The content rate of the total unavoidable impurities in third layer 5 is preferably greater than 0% by mass and less than 3% by mass.

Third layer 5 being composed of titanium carbonitride is measured by an X-ray diffraction (XRD) method and an energy dispersive X-ray analysis (EDX). In third layer 5, the content rate of unavoidable impurities is measured by secondary ion mass spectrometry (SIMS). As long as the measurement is carried out on the same cutting tool 10, it has been confirmed that there is no variation in the measurement results even if measurement points are arbitrarily selected.

<Structure of the Third Layer>

A thickness of third layer 5 is preferably 2 μm or more and 4 μm or less. This enables achievement of both superior breakage resistance and superior wear resistance, whereby a cutting tool with a longer tool service life, particularly even in light intermittent turning of alloy steel with a black skin material, can be provided. The lower limit of the thickness of third layer 5 is preferably 2 μm or more and more preferably 2.5 μm or more. The upper limit of the thickness of third layer 5 is preferably 4 pun or less and more preferably 3.5 un or less. The thickness of third layer 5 is more preferably 2.5 μm or more and 3.5 μm or less.

<Residual Stress of the Third Layer>

A residual stress Z of third layer 5 is preferably −0.3 GPa or more and 0.4 GPa or less. This facilitates inhibition of flank face wear in an early stage of processing, whereby a cutting tool with a longer tool service life, particularly even in light intermittent turning of alloy steel with a black skin material, can be provided. The lower limit of residual stress Z of third layer 5 is preferably −0.3 GPa or more, more preferably −0.2 GPa or more, and further preferably −0.1 GPa or more. The upper limit of residual stress Z of third layer 5 is preferably 0.4 GPa or less, more preferably 0.3 GPa or less, and further preferably 0.2 GPa or less. Residual stress Z of third layer 5 is more preferably −0.2 GPa or more and 0.3 GPa or less and further preferably −0.1 GPa or more and 0.2 GPa or less.

Residual stress Z of third layer 5 can be identified by the same measurement method as that for residual stress X of first layer 3, except that the measurement is carried out on third layer 5. As long as the measurement is carried out on the same cutting tool 10, it has been confirmed that there is no variation in the measurement results even if the measurement points are arbitrarily selected.

<Relationship Between the First Layer, Second Layer, and Third Layer>

Residual stress X of first layer 3, residual stress Y of second layer 4 and residual stress Z of third layer 5 satisfy the relationship of formula 1:

$$X<Y<Z \qquad \text{formula 1.}$$

This allows cutting tool 10 to combine both the excellent wear resistance and excellent breakage resistance, whereby cutting tool 10 can exhibit a long tool service life, particularly even in light intermittent turning of alloy steel with a black skin material.

A Y-X is preferably 0.1 or more and 0.6 or less. This hardly causes chipping to occur from first layer 3 toward second layer 4, whereby cutting tool can have superior breakage resistance. Y-X is more preferably 0.15 or more and 0.55 or less and further preferably 0.2 or more and 0.5 or less.

A Y-Z is preferably −0.6 or more and −0.1 or less. This hardly causes chipping to occur from second layer 4 toward third layer 5, whereby cutting tool 10 can have superior breakage resistance. Y-Z is more preferably −0.55 or more and −0.15 or less and further preferably −0.50 or more and −0.20 or less.

<Other Layers>

Examples of other layers can include, for example, a base layer (not shown), an intermediate layer (not shown), a surface layer (not shown), and the like. The base layer is a layer arranged between substrate 1 and first layer 3. The surface layer is a layer positioned on a surface of coated film 2. The intermediate layer is a layer arranged between first layer 3 and second layer 4, between second layer 4 and third layer 5, or layers arranged both therebetween. Note, however, the intermediate layer is a thin adhesion layer such as TiCNO. Therefore, the intermediate layer has no effect on a stress distribution.

Embodiment 2: Manufacturing Method of Cutting Tool

Figure 2:
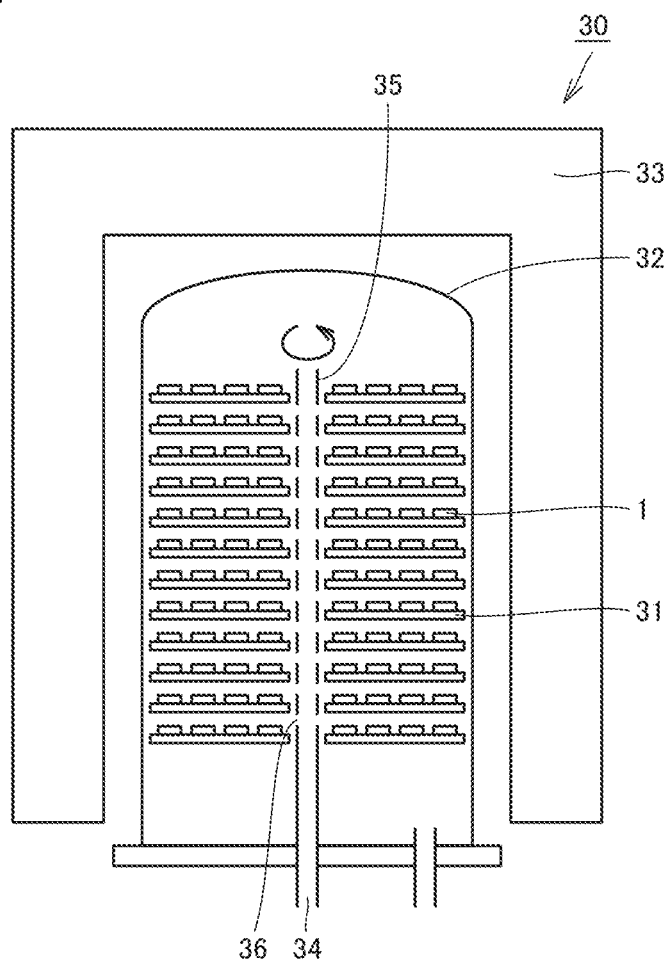
FIG. 2 is a schematic cross-sectional view of an example of a CVD (Chemical Vapor Deposition) apparatus used in manufacturing of the cutting tool of the present disclosure.

A method for manufacturing the cutting tool of the present embodiment will be described using FIG. 2. FIG. 2 is a schematic cross-sectional view of an example of a CVD apparatus used in the manufacturing of the cutting tool of the present embodiment.

The method for manufacturing the cutting tool of the present embodiment is a method for manufacturing the cutting tool described in Embodiment 1, including
  the first step of preparing a substrate,
  the second step of forming a coated film on the substrate, and
  the third step of subjecting the coated film to blast processing, to obtain a cutting tool,
  wherein the second step includes the second A step of forming the first layer by a CVD method, the second B step of forming the second layer by the CVD method, and the second C step of forming the third layer by the CVD method, in this order. The details of each process will be described below.

<<First Step>>

In the first step, a substrate is prepared. The substrate can be the substrate described in Embodiment 1.

For example, when a cemented carbide is used as the substrate, a commercially available substrate may be used, or the substrate may be manufactured by a general powder metallurgical method. In the case of the manufacturing by the general powder metallurgical method, for example, WC powder, Co powder, and the like, are mixed by a ball mill or the like to obtain mixed powder. After drying the mixed powder, it is formed into a predetermined shape to obtain a formed material. The formed material is then sintered to obtain a WC—Co cemented carbide (sintered material). Next, the sintered material is subjected to predetermined cutting edge processing, such as boning, to be able to manufacture a substrate composed of a WC—Co cemented carbide. A substrate other than those described above can also be prepared, as long as it is conventionally known as a substrate of this type.

<<Second Step>>

In the second step, a coated film is formed on the substrate described above to obtain a cutting tool. The formation of the coated film is performed, for example, by using the CVD apparatus shown in FIG. 2. A CVD apparatus 30 is equipped with a plurality of substrate-setting jigs 31 for holding substrate 1 and a reaction vessel 32 made of heat-resistant alloy steel covering substrate-setting jigs 31. Moreover, at a circumference of reaction vessel 32, a temperature regulator 33 is arranged for controlling temperature inside reaction vessel 32. Reaction vessel 32 is provided with a gas inlet pipe 35 having a gas inlet port 34. Gas inlet pipe 35 is arranged so as to extend toward a vertical direction and be rotatable about an axis in the vertical direction, in an inner space of reaction vessel 32 where substrate-setting jigs 31 is arranged, and is provided with a plurality of blowout holes (through holes 36) for allowing gas to blow out into reaction vessel 32. By using this CVD apparatus 30, the first layer, second layer, and third layer, which constitute the aforementioned coated film, can be formed as follows.

The second step includes the second A step of forming the first layer by the CVD method, the second B step of forming the second layer by the CVD method, and the second C step of forming the third layer by the CVD method, in this order. In a case in which the coated film includes the "other layers" described in Embodiment 1, the "other layers" can be formed by conventionally known methods.

<Second A Step: Step of Forming the First Layer by a CVD Method>

In the second A step, the first layer is formed by the CVD method. More specifically, first, substrate 1 is arranged on substrate-setting jig 31, and while controlling temperature and pressure in reaction vessel 32 to a predetermined range, a raw material gas for the first layer is introduced into reaction vessel 32 from gas inlet pipe 35. This allows the first layer to be formed on substrate 1.

As the raw material gas for the first layer, a mix gas of $TiCl_4$, $CH_3CN$, CO, $N_2$, HCl, and $H_2$ is used.

The content rate of $TiCl_4$ in the mixed gas is preferably 8.0% by volume or more and 9.0% by volume or less. The content rate of $CH_3CN$ in the mixed gas is preferably 0.2% by volume or more and 1.0% by volume or less. The content rate of CO in the mixed gas is preferably 1.3% by volume or more and 2.0% by volume or less. The content rate of $N_2$ in the mixed gas is preferably 8.0% by volume or more and 12.0% by volume or less. The content rate of HCl in the mixed gas is preferably 1.0% by volume or more and 3.0% by volume or less.

A temperature in reaction vessel 32 is preferably controlled at 800° C. or more and 850° C. or less, and pressure in reaction vessel 32 is preferably controlled at 100 hPa or more and 120 hPa or less. Note, however, gas inlet pipe 35 is preferably rotated upon introduction of gas.

With respect to the aforementioned manufacturing method, control of each condition of the CVD method changes an aspect of the first layer. For example, by adjusting a deposition time, a thickness of the first layer is controlled.

<Second B Step: Step of Forming the Second Layer by the CVD Method>

In the second B step, the second layer is formed by the CVD method More specifically, first, the first cutting tool precursor in which the first layer has been formed on a substrate is arranged on substrate-setting jig 31, and while controlling temperature and pressure in reaction vessel 32 to a predetermined range, a raw material gas for the second layer is introduced into reaction vessel 32 from gas inlet pipe 35. This allows the second layer to be formed on the first layer.

As the raw material gas for the second layer, a mix gas of $AlCl_3$, $CO_2$, $H_2S$, and $H_2$ is used.

The content rate of $AlCl_3$ in the mixed gas is preferably 2.0% by volume or more and 2.5% by volume or less. The content rate of $CO_2$ in the mixed gas is preferably 2.5% by volume or more and 3.5% by volume or less. The content rate of $H_2S$ in the mixed gas is preferably 0.5% by volume or more and 1.0% by volume or less.

A temperature in reaction vessel 32 is preferably controlled at 980° C. or more and 1015° C. or less, and pressure in reaction vessel 32 is preferably controlled at 60 hPa or more and 75 hPa or less. It is noted that gas inlet pipe 35 is preferably rotated upon introduction of gas.

With respect to the aforementioned manufacturing method, control of each condition of the CVD method changes an aspect of the second layer. For example, by adjusting a deposition time, a thickness of the second layer is controlled.

<Second C Step: Step of Forming the Third Layer by the CVD Method>

In the second C step, the third layer is formed by the CVD method. More specifically, first, the second cutting tool precursor in which the first layer is formed on a substrate and the second layer was formed on the first layer is arranged on substrate-setting jig 31, and while controlling temperature and pressure in reaction vessel 32 to a predetermined range, a raw material gas for the third layer is introduced into reaction vessel 32 from gas inlet pipe 35. This allows the third layer to be formed on the second layer.

As the raw material gas for the third layer, a mix gas of $TiCl_4$, $CH_3CN$, CO, $N_2$, HCl, and $H_2$ is used.

The content rate of $TiCl_4$ in the mixed gas is preferably 8.0% by volume or more and 9.0% by volume or less. The content rate of $CH_3CN$ in the mixed gas is preferably 0.2% by volume or more and 0.8% by volume or less. The content rate of CO in the mixed gas is preferably 1.3% by volume or more and 2.0% by volume or less. The content rate of $N_2$ in the mixed gas is preferably 8.0% by volume or more and 12.0% by volume or less. The content rate of HCl in the mixed gas is preferably 1.0% by volume or more and 3.0% by volume or less.

A temperature in reaction vessel 32 is preferably controlled at 950° C. or more and 1000° C. or less, and pressure in reaction vessel 32 is preferably controlled at 80 hPa or more and 100 hPa or less. Note, however, gas inlet pipe 35 is preferably rotated upon introduction of gas.

With respect to the aforementioned manufacturing method, control of each condition of the CVD method changes an aspect of the third layer. For example, by adjusting a deposition time, a thickness of the third layer is controlled.

<Third Step: Step of Subjecting a Coated Film to Blast Processing to Obtain a Cutting Tool>

In the third step, a coated film is subjected to blast processing to obtain a cutting tool. The "blast processing" herein refers to processing in which a large number of small spheres (media) of steel, a nonferrous metal (for example, a ceramic), or the like is collided (projected) onto a surface of a coated film, such as a rake face at high speed, to change various properties of the surface, such as a residual stress.

Examples of the type of medium include a ceramic, zirconia, alumina, and the like.

An average particle size of the media is 100 μm or more and 200 μm or less.

A concentration of the media to be projected is 100 g/min or more and 350 g/min or less. The concentration of the media to be projected is preferably 150 g/min or more and 250 g/min or less.

A distance between a projection area where the media are projected and a surface of a coated film (also referred to as "projection distance") is 35 mm or more and 60 mm or less. The projection distance is preferably 35 mm or more and 50 mm or less.

A projection angle of the media is 75° to a surface of a coated film.

Pressure applied to the aforementioned media upon projection (hereinafter also referred to as "projection pressure") is preferably 0.10 MPa or more and 0.50 MPa or less and more preferably 0.15 MPa or more and 0.45 MPa or less.

A processing time of blast processing is preferably 20 seconds or more and 30 seconds or less.

Each condition of the aforementioned blast processing can be appropriately adjusted according to a composition of the aforementioned coated film.

<Other Steps>

In the manufacturing method according to the present embodiment, an additional step may be appropriately carried out in addition to the steps described above, to the extent that the effects of the present embodiment are not impaired.

<Characteristics of the Manufacturing Method of a Cutting Tool of the Present Embodiment>

The cutting tool obtained by the aforementioned manufacturing method is a cutting tool including a substrate and a coated film arranged on the substrate, wherein the coated film includes a first layer positioned on the substrate, a second layer positioned on the first layer, and a third layer positioned on the second layer, the first layer is composed of titanium carbonitride, the second layer is composed of aluminum oxide, and the third layer is composed of titanium carbonitride, and wherein a residual stress X of the first layer, a residual stress Y of the second layer and a residual stress Z of the third layer satisfy the relationship of formula 1:

$$X<Y<Z \qquad \text{formula 1.}$$

The reason therefore is surmised as follows.

The method for manufacturing a cutting tool of the present embodiment is characterized in that it is implemented, particularly by forming the third layer positioned on the second layer in the second C step, followed by using, in the third step, coarse media with an average particle size of from 100 to 200 μm, setting a concentration of the media to 100 g/min or more and 350 g/min or less, a projection angle of the media to 75° to a surface of a coated film, and a projection distance to 35 mm or more and 60 mm or less. Projecting the coarse media at a projection angle of 75°, facilitates a stress to be introduced to a substrate side of the coated film. The low concentration of the media facilitates a projection speed of the media to be faster, which facilitates further introduction of a stress to a substrate side of the coated film. The long projection distance can also make a difference between a stress in the third layer and a stress in the second layer. All those described above allow residual stress X of the first layer, residual stress Y of the second layer and residual stress Z of the third layer to satisfy the relationship of formula 1 above. This has been newly found by the present inventors as a result of their diligent investigations.

EXAMPLES

The present embodiment will be more specifically described by way of Examples. However, the present embodiment is not limited by these Examples.

<<Fabrication of Cutting Tool>>

Cutting tools according to samples 1 to 31 and 101 to 104 were prepared in the following manner.

<First Step>

An indexable cutting insert made of a cemented carbide (SEET13T3AGSN-G, manufactured by Sumitomo Electric Hardmetal Corp.) with a composition composed of TaC (2.0% by mass), Co (11.0% by mass), and WC (the residual percentage by mass) (provided that unavoidable impurities were contained), was prepared as a substrate.

<Second Step>

The first layer was formed on the above substrate by the CVD method under the following conditions so that the composition of the first layer was as described in Tables 3 and 4 (the second A step). A deposition time was appropriately adjusted so that a thickness of the first layer was as described in Tables 3 and 4.

(Conditions of the Second A Step)

The content rate of $TiCl_4$ in the mixed gas: 8.0 to 9.0% by volume

The content rate of $CH_3CN$ in the mixed gas: 0.2 to 1.0% by volume.

The content rate of CO in the mixed gas: 1.3 to 2.0% by volume.

The content rate of $N_2$ in the mixed gas: 8.0 to 12.0% by volume.

The content rate of HCl in the mixed gas: 1.0 to 3.0% by volume.

The content rate of $H_2$ in the mixed gas: The residual percentage by volume.

Temperature: 800 to 850° C.

Pressure: 100 to 120 hPa

Next, the second layer was formed on the above first layer by the CVD method under the following conditions so that a composition of the second layer was as described in Tables 3 and 4 (the second B step). A deposition time was appropriately adjusted so that a thickness of the second layer was as described in Tables 3 and 4.

(Conditions of the Second B Step)

The content rate of $AlCl_3$ in the mixed gas: 2.0 to 2.5% by volume.

The content rate of $CO_2$ in the mixed gas: 2.5 to 3.5% by volume.

The content rate of $H_2S$ in the mixed gas: 0.5 to 1.0% by volume.

The content rate of $H_2$ in the mixed gas: The residual percentage by volume.

Temperature: 980 to 1015° C.

Pressure: 60 to 75 hPa

Next, the third layer was formed on the above second layer by the CVD method under the following conditions so that a composition of the third layer was as described in Tables 3 and 4 (the second C step). A deposition time was appropriately adjusted so that a thickness of the third layer was as described in Tables 3 and 4.

(Conditions of the Second C Step)

The content rate of $TiCl_4$ in the mixed gas: 8.0 to 9.0% by volume.

The content rate of $CH_3CN$ in the mixed gas: 0.2 to 0.8% by volume.

The content rate of CO in the mixed gas: 1.3 to 2.0% by volume.

The content rate of $N_2$ in the mixed gas: 8.0 to 12.0% by volume.

The content rate of HCl in the mixed gas: 1.0 to 3.0% by volume.

The content rate of $H_2$ in the mixed gas: The residual percentage by volume

Temperature: 950 to 1,000° C.

Pressure: 80 to 100 hPa

<Third Step>

Blast processing was performed on a surface of the cutting tool with the first layer, second layer, and third layer formed (in other words, a cutting tool with a coated film formed) under the conditions described in Tables 1 and 2.

The cutting tools according to samples 1 to 31 and 101 to 104 were prepared by the procedure described above.

TABLE 1

| | | Third step | | | | | | |
|---|---|---|---|---|---|---|---|---|
| | | Media | | | | | | |
| Sample No. | Type | Average particle size [μm] | Concentration [g/min] | Projection angle [°] | Projection distance [mm] | Projection pressure [MPa] | Time [sec] | Rotational speed of cutting tool [rpm] |
| Sample 1 | Ceramic | 150 | 350 | 75 | 35 | 0.30 | 25 | 60 |
| Sample 2 | Ceramic | 150 | 350 | 75 | 45 | 0.30 | 25 | 60 |
| Sample 3 | Ceramic | 150 | 350 | 75 | 60 | 0.30 | 25 | 60 |
| Sample 4 | Ceramic | 150 | 250 | 75 | 35 | 0.35 | 25 | 60 |
| Sample 5 | Ceramic | 150 | 250 | 75 | 45 | 0.35 | 25 | 60 |
| Sample 6 | Ceramic | 150 | 250 | 75 | 60 | 0.35 | 25 | 60 |
| Sample 7 | Ceramic | 150 | 100 | 75 | 35 | 0.40 | 25 | 60 |
| Sample 8 | Ceramic | 150 | 100 | 75 | 45 | 0.40 | 25 | 60 |
| Sample 9 | Ceramic | 150 | 100 | 75 | 60 | 0.40 | 25 | 60 |
| Sample 10 | Ceramic | 150 | 350 | 75 | 35 | 0.30 | 25 | 60 |
| Sample 11 | Ceramic | 150 | 350 | 75 | 35 | 0.30 | 25 | 60 |
| Sample 12 | Ceramic | 150 | 350 | 75 | 35 | 0.30 | 25 | 60 |
| Sample 13 | Ceramic | 150 | 350 | 75 | 35 | 0.30 | 25 | 60 |
| Sample 14 | Ceramic | 150 | 100 | 75 | 45 | 0.45 | 25 | 60 |
| Sample 15 | Ceramic | 150 | 150 | 75 | 45 | 0.45 | 25 | 60 |
| Sample 16 | Ceramic | 150 | 250 | 75 | 35 | 0.15 | 25 | 60 |
| Sample 17 | Ceramic | 150 | 300 | 75 | 35 | 0.15 | 25 | 60 |
| Sample 18 | Ceramic | 150 | 350 | 75 | 35 | 0.30 | 25 | 60 |
| Sample 19 | Ceramic | 150 | 350 | 75 | 35 | 0.30 | 25 | 60 |
| Sample 20 | Ceramic | 150 | 350 | 75 | 35 | 0.30 | 25 | 60 |

TABLE 2

| | | Third step | | | | | | |
|---|---|---|---|---|---|---|---|---|
| | | Media | | | | | | |
| Sample No. | Type | Average particle size [μm] | Concentration [g/min] | Projection angle [°] | Projection distance [mm] | Projection pressure [MPa] | Time [sec] | Rotational speed of cutting tool [rpm] |
| Sample 21 | Ceramic | 150 | 350 | 75 | 60 | 0.50 | 25 | 60 |
| Sample 22 | Ceramic | 150 | 300 | 75 | 55 | 0.45 | 25 | 60 |
| Sample 23 | Ceramic | 150 | 100 | 75 | 35 | 0.10 | 25 | 60 |
| Sample 24 | Ceramic | 150 | 150 | 75 | 40 | 0.15 | 25 | 60 |
| Sample 25 | Ceramic | 150 | 350 | 75 | 35 | 0.30 | 25 | 60 |
| Sample 26 | Ceramic | 150 | 350 | 75 | 35 | 0.30 | 25 | 60 |
| Sample 27 | Ceramic | 150 | 350 | 75 | 35 | 0.30 | 25 | 60 |
| Sample 28 | Ceramic | 150 | 350 | 75 | 35 | 0.45 | 25 | 60 |
| Sample 29 | Ceramic | 150 | 350 | 75 | 40 | 0.45 | 25 | 60 |
| Sample 30 | Ceramic | 150 | 100 | 75 | 60 | 0.25 | 25 | 60 |
| Sample 31 | Ceramic | 150 | 100 | 75 | 55 | 0.25 | 25 | 60 |
| Sample 101 | Ceramic | 150 | 400 | 75 | 45 | 0.40 | 25 | 60 |
| Sample 102 | Ceramic | 150 | 250 | 75 | 30 | 0.25 | 25 | 60 |
| Sample 103 | Ceramic | 150 | 400 | 75 | 30 | 0.35 | 25 | 60 |
| Sample 104 | Ceramic | 150 | 450 | 75 | 25 | 0.4 | 25 | 60 |

TABLE 3

| | Coating film | | | | | | | | | | | Tool |
|---|---|---|---|---|---|---|---|---|---|---|---|---|
| | First layer | | | Second layer | | | Third layer | | | | | |
| Sample No. | com-position | Thick-ness [μm] | X [GPa] | com-position | Thick-ness [μm] | Y [GPa] | com-position | Thick-ness [μm] | Z [GPa] | Thick-ness [μm] | Y-X | Y-Z | service life [min] |
| Sample 1 | TiCN | 3 | −0.3 | Al₂O₃ | 15 | −0.2 | TiCN | 2 | −0.1 | 20 | 0.1 | −0.1 | 30 |
| Sample 2 | TiCN | 3 | −0.3 | Al₂O₃ | 15 | 0.2 | TiCN | 2 | 0.1 | 20 | 0.1 | −0.3 | 35 |
| Sample 3 | TiCN | 3 | −0.3 | Al₂O₃ | 15 | −0.2 | TiCN | 2 | 0.4 | 20 | 0.1 | −0.6 | 30 |
| Sample 4 | TiCN | 15 | −0.6 | Al₂O₃ | 3 | 0.3 | TiCN | 4 | 0.2 | 22 | 0.3 | −0.1 | 35 |
| Sample 5 | TiCN | 15 | −0.6 | Al₂O₃ | 3 | −0.3 | TiCN | 4 | 0 | 22 | 0.3 | −0.3 | 40 |
| Sample 6 | TiCN | 15 | −0.6 | Al₂O₃ | 3 | −0.3 | TiCN | 4 | 0.3 | 22 | 0.3 | −0.6 | 35 |
| Sample 7 | TiCN | 9 | −1.0 | Al₂O₃ | 9 | −0.4 | TiCN | 3 | −0.3 | 21 | 0.6 | −0.1 | 30 |
| Sample 8 | TiCN | 9 | −1.0 | Al₂O₃ | 9 | −0.4 | TiCN | 3 | 0.1 | 21 | 0.6 | −0.3 | 35 |
| Sample 9 | TiCN | 9 | −1.0 | Al₂O₃ | 9 | −0.4 | TiCN | 3 | 0.2 | 21 | 0.6 | −0.6 | 30 |
| Sample 10 | TiCN | 2 | −0.3 | Al₂O₃ | 15 | 0.2 | TiCN | 3 | 0.1 | 20 | 0.1 | −0.1 | 25 |
| Sample 11 | TiCN | 3 | −0.3 | Al₂O₃ | 15 | −0.2 | TiCN | 3 | 0.1 | 21 | 0.1 | −0.1 | 30 |
| Sample 12 | TiCN | 16 | −0.3 | Al₂O₃ | 9 | 0.2 | TiCN | 3 | 0.1 | 28 | 0.1 | −0.1 | 25 |
| Sample 13 | TiCN | 15 | −0.3 | Al₂O₃ | 9 | 0.2 | TiCN | 3 | 0.1 | 27 | 0.1 | −0.1 | 30 |
| Sample 14 | TiCN | 9 | −1.1 | Al₂O₃ | 9 | 0.5 | TiCN | 3 | −0.2 | 21 | 0.6 | −0.3 | 25 |
| Sample 15 | TiCN | 6 | −1.0 | Al₂O₃ | 9 | 0.5 | TiCN | 3 | 0.2 | 21 | 0.5 | −0.3 | 30 |
| Sample 16 | TiCN | 9 | −0.2 | Al₂O₃ | 9 | 0.1 | TiCN | 3 | 0.2 | 21 | 0.3 | −0.1 | 20 |
| Sample 17 | TiCN | 9 | −0.3 | Al₂O₃ | 9 | 0.1 | TiCN | 3 | 0.2 | 21 | 0.4 | −0.1 | 30 |
| Sample 18 | TiCN | 15 | −0.3 | Al₂O₃ | 2 | 0.2 | TiCN | 3 | −0.1 | 20 | 0.1 | −0.1 | 25 |
| Sample 19 | TiCN | 15 | −0.3 | Al₂O₃ | 3 | −0.2 | TiCN | 3 | 0.1 | 21 | 0.1 | −0.1 | 30 |
| Sample 20 | TiCN | 3 | −0.3 | Al₂O₃ | 16 | −0.2 | TiCN | 3 | −0.1 | 22 | 0.1 | −0.1 | 25 |

TABLE 4

| | Coating film | | | | | | | | | | | Tool |
|---|---|---|---|---|---|---|---|---|---|---|---|---|
| | First layer | | | Second layer | | | Third layer | | | | | |
| Sample No. | com-position | Thick-ness [μm] | X [GPa] | com-position | Thick-ness [μm] | Y [GPa] | com-position | Thick-ness [μm] | Z [GPa] | Thick-ness [μm] | Y-X | Y-Z | service life [min] |
| Sample 21 | TiCN | 9 | −0.7 | Al₂O₃ | 9 | −0.6 | TiCN | 3 | 0 | 21 | 0.1 | −0.6 | 25 |
| Sample 22 | TiCN | 9 | −0.7 | Al₂O₃ | 9 | −0.5 | TiCN | 3 | 0 | 21 | 0.2 | −0.5 | 30 |
| Sample 23 | TiCN | 9 | −0.4 | Al₂O₃ | 9 | 0.2 | TiCN | 3 | 0.3 | 21 | 0.6 | −0.1 | 20 |
| Sample 24 | TiCN | 9 | −0.4 | Al₂O₃ | 9 | 0.1 | TiCN | 3 | 0.3 | 21 | 0.5 | −0.2 | 30 |
| Sample 25 | TiCN | 9 | −0.3 | Al₂O₃ | 9 | −0.2 | TiCN | 1 | −0.1 | 19 | 0.1 | −0.1 | 25 |
| Sample 26 | TiCN | 9 | −0.3 | Al₂O₃ | 9 | −0.2 | TiCN | 2 | −0.1 | 20 | 0.1 | −0.1 | 30 |
| Sample 27 | TiCN | 9 | −0.3 | Al₂O₃ | 9 | −0.2 | TiCN | 5 | −0.1 | 23 | 0.1 | −0.1 | 25 |
| Sample 28 | TiCN | 9 | −0.6 | Al₂O₃ | 9 | −0.5 | TiCN | 3 | −0.4 | 21 | 0.1 | −0.1 | 25 |
| Sample 29 | TiCN | 9 | −0.6 | Al₂O₃ | 9 | −0.5 | TiCN | 3 | −0.3 | 21 | 0.1 | −0.2 | 30 |
| Sample 30 | TiCN | 9 | −0.7 | Al₂O₃ | 9 | −0.1 | TiCN | 3 | 0.5 | 21 | 0.6 | −0.6 | 25 |
| Sample 31 | TiCN | 9 | −0.7 | Al₂O₃ | 9 | −0.1 | TiCN | 3 | 0.4 | 21 | 0.6 | −0.5 | 30 |
| Sample 101 | TiCN | 9 | −0.4 | Al₂O₃ | 9 | −0.4 | TiCN | 3 | −0.1 | 21 | 0 | −0.3 | 15 |
| Sample 102 | TiCN | 9 | −0.4 | Al₂O₃ | 9 | −0.1 | TiCN | 3 | −0.1 | 21 | 0.3 | 0 | 15 |
| Sample 103 | TiCN | 9 | −0.3 | Al₂O₃ | 9 | −0.3 | TiCN | 3 | −0.3 | 21 | 0 | 0 | 15 |
| Sample 104 | TiCN | 9 | −0.3 | Al₂O₃ | 9 | −0.4 | TiCN | 3 | −0.5 | 21 | −0.1 | 0.1 | 10 |

<<Evaluation of Characteristics of Cutting Tool>>

<Composition of the First Layer>

For each of the cutting tools according to each sample, the composition of the first layer was determined by the method described in Embodiment 1. The results obtained are denoted in the "Composition" columns of the "First layer" column in each of Tables 3 and 4. When described as the "TiCN" in the "Composition" columns of the "First layer" column in each of Tables 3 and 4, the first layer refers to that which is composed of titanium carbonitride.

<Residual Stress X of the First Layer>

For each of the cutting tools according to each sample, residual stress X of the first layer was determined by the method described in Embodiment 1. The results obtained are denoted in the "X [GPa]" columns in each of Tables 3 and 4.

<Composition of the Second Layer>

For each of the cutting tools according to each sample, the composition of the second layer was determined by the method described in Embodiment 1. The results obtained are denoted in the "Composition" columns of the "Second layer" column in each of Tables 3 and 4. When described as "Al₂O₃" in the "Composition" columns of the "Second layer" column in each of Tables 3 and 4, the second layer refers to that which is composed of aluminum oxide.

<Residual Stress V of the Second Layer>

For each of the cutting tools according to each sample, residual stress V of the second layer was determined by the method described in Embodiment 1. The results obtained are denoted in the "Y [GPa]" columns in each of Tables 3 and 4.

<Composition of the Third Layer>

For each of the cutting tools according to each sample, the composition of the third layer was determined by the method described in Embodiment 1 The results obtained are denoted in the "Composition" columns of the "Third layer" column in each of Tables 3 and 4. When described as "TiCN" in the "Composition" columns of the "Third layer" column in each of Tables 3 and 4, the third layer refers to that which is composed of titanium carbonitride.

<Residual Stress Z of the Third Layer>

For each of the cutting tools according to each sample, residual stress Z of the third layer was determined by the method described in Embodiment 1. The results obtained are denoted in the "Z [GPa]" columns in each of Tables 3 and 4.

<Thickness of Coated Film>

For each of the cutting tool according to each sample, a thickness of the coated film was determined by the method described in Embodiment 1. The results obtained are denoted in the "Thickness [μm]" columns of the "Coated film" column in each of Tables 3 and 4.

<Cutting Test>

A cutting test was carried out by using each of the cutting tools according to each sample under the following cutting conditions. A tool service life was measured as time when damage develops due to a combination of wear and slight breakage, and the amount of flank face wear, Vb [mm] exceeds 0.3 mm. The results obtained are denoted in the "Tool service life [min]" columns in each of Tables 3 and 4.

(Cutting Conditions)

Workpiece: SCM440 (round bar with flutes)
Processing: Turning of an outer diameter portion of a round bar with flutes
Cutting speed: 250 m/min
Feed rate: 0.3 mm/rev
Length of cutting depth: 2.0 mm
Cutting fluid: Water soluble cutting oil The above cutting conditions correspond to the cutting conditions for light intermittent turning of alloy steel with a black skin material.

The cutting tools according to samples 1 to 31 correspond to Examples. The cutting tools according to samples 101 to 104 correspond to Comparative Examples. From the results of Tables 3 and 4, compared to the cutting tools according to samples 101 to 104, the cutting tools according to samples 1 to 31 were found to have a longer tool service life, even in light intermittent turning of alloy steel with a black skin material.

From all those described above, it was found that the cutting tools according to samples 1 to 31 have a long tool service life, particularly even in light intermittent turning of alloy steel with a black skin material.

The embodiments and Examples of the present disclosure have been described as above, and it is contemplated from the beginning to appropriately combine the configurations of each of the embodiments and Examples described above, or to variously modify them.

The embodiments and Examples disclosed herein are in all respects illustrative and should not be considered limitative. The scope of the present invention is indicated by the claims, not by the aforementioned embodiments and Examples, and is intended to include the scope of the claims, the meanings of equivalence thereof, and all changes within the scope.

REFERENCE SIGNS LIST

1 Substrate; 2 Coated film; 3 First layer; 4 Second layer; 5 Third layer; 10 Cutting tool; 30 CVD apparatus; 31 Substrate-setting jig; 32 Reaction vessel; 33 Temperature controller; 34 Gas inlet port, 35 Gas inlet pipe; 36 Through hole.

The invention claimed is:

1. A cutting tool comprising a substrate and a coated film arranged on the substrate,
    wherein the coated film comprises a first layer positioned on the substrate, a second layer positioned on the first layer, and a third layer positioned on the second layer,
    wherein the first layer is composed of titanium carbonitride,
    wherein the second layer is composed of aluminum oxide,
    wherein the third layer is composed of titanium carbonitride,
    wherein a residual stress X of the first layer, a residual stress Y of the second layer and a residual stress Z of the third layer satisfy a relationship of formula 1:

$$X<Y<Z \qquad \text{formula 1,}$$

wherein the residual stress X of the first layer is −1.0 GPa or more and −0.3 GPa or less,
    wherein the residual stress Y of the second layer is −0.5 GPa or more and 0.1 GPa or less, and
    wherein the residual stress Z of the third layer is −0.3 GPa or more and 0.4 GPa or less.

2. The cutting tool according to claim 1, wherein a thickness of the first layer is 3 μm or more and 15 μm or less.

3. The cutting tool according to claim 2, wherein the residual stress X of the first layer is −0.8 GPa or more and −0.5 GPa or less,
    wherein the residual stress Y of the second layer is −0.3 GPa or more and −0.1 GPa or less, and
    wherein the residual stress Z of the third layer is −0.1 GPa or more and 0.2 GPa or less.

4. The cutting tool according to claim 1, wherein a thickness of the second layer is 3 μm or more and 15 μm or less.

5. The cutting tool according to claim 4, wherein the residual stress X of the first layer is −0.8 GPa or more and −0.5 GPa or less,
    wherein the residual stress Y of the second layer is −0.3 GPa or more and −0.1 GPa or less, and
    wherein the residual stress Z of the third layer is −0.1 GPa or more and 0.2 GPa or less.

6. The cutting tool according to claim 1, wherein a thickness of the third layer is 2 μm or more and 4 μm or less.

7. The cutting tool according to claim 6, wherein the residual stress X of the first layer is −0.8 GPa or more and −0.5 GPa or less,
    wherein the residual stress Y of the second layer is −0.3 GPa or more and −0.1 GPa or less, and
    wherein the residual stress Z of the third layer is −0.1 GPa or more and 0.2 GPa or less.

8. The cutting tool according to claim 1, wherein a thickness of the coated film is between 6 μm and 30 μm.

9. The cutting tool according to claim 1, wherein Y-X is between 0.1 and 0.6.

10. The cutting tool according to claim 1, wherein Y-Z is between −0.6 and −0.1.

11. The cutting tool according to claim 1, wherein Y-X is between 0.1 and 0.6, and
    wherein Y-Z is between −0.6 and −0.1.

12. The cutting tool according to claim 1, wherein a thickness of the coated film is between 6 μm and 30 μm,
    wherein Y-X is between 0.1 and 0.6, and
    wherein Y-Z is between −0.6 and −0.1.

13. The cutting tool according to claim 1, wherein the substrate is comprised of cemented carbides.

14. The cutting tool according to claim 1, wherein the residual stress of the coated film is changed using blast processing.

15. The cutting tool according to claim 1, wherein a thickness of the first layer is 3 μm or more and 15 μm or less, and
wherein a thickness of the second layer is 3 μm or more and 15 μm or less.

16. The cutting tool according to claim 15, wherein a thickness of the third layer is 2 μm or more and 4 μm or less.

17. The cutting tool according to claim 16, wherein a thickness of the coated film is between 6 μm and 30 μm.

18. The cutting tool according to claim 17, wherein Y-X is between 0.1 and 0.6.

19. The cutting tool according to claim 18, wherein Y-Z is between −0.6 and −0.1.

20. The cutting tool according to claim 19, wherein the residual stress X of the first layer is −0.8 GPa or more and −0.5 GPa or less,
wherein the residual stress Y of the second layer is −0.3 GPa or more and −0.1 GPa or less, and
wherein the residual stress Z of the third layer is −0.1 GPa or more and 0.2 GPa or less.

* * * * *